(12) United States Patent
Parton (10) Patent No.: US 8,151,828 B2
(45) Date of Patent: Apr. 10, 2012

(54) PIPE-CLAMPING TOOL

(75) Inventor: Carl Trevor Parton, Staffordshire (GB)

(73) Assignee: Leak Mate Distribution Limited (GB)

( * ) Notice: Subject to any disclaimer, the term of this patent is extended or adjusted under 35 U.S.C. 154(b) by 0 days.

(21) Appl. No.: 12/918,788

(22) PCT Filed: Mar. 4, 2009

(86) PCT No.: PCT/GB2009/000579
§ 371 (c)(1),
(2), (4) Date: Aug. 20, 2010

(87) PCT Pub. No.: WO2009/112805
PCT Pub. Date: Sep. 17, 2009

(65) Prior Publication Data
US 2011/0000568 A1    Jan. 6, 2011

(30) Foreign Application Priority Data
Mar. 11, 2008  (GB) .................................. 0804452.1
Apr. 29, 2008  (GB) .................................. 0807736.4

(51) Int. Cl.
*F16L 55/16* (2006.01)
(52) U.S. Cl. .......... 138/99; 138/97; 285/373; 137/15.01
(58) Field of Classification Search .................... 138/99, 138/98; 269/249, 270; D8/73
See application file for complete search history.

(56) References Cited

U.S. PATENT DOCUMENTS

| | | | | |
|---|---|---|---|---|
| 1,160,284 A | * | 11/1915 | Headly | 285/373 |
| 1,601,264 A | | 9/1926 | Ryan | 138/99 |
| 1,843,057 A | | 1/1932 | Wood et al. | 138/99 |
| 2,009,046 A | | 7/1935 | Fons | 138/99 |

(Continued)

FOREIGN PATENT DOCUMENTS

EP  0697552  2/1996

(Continued)

OTHER PUBLICATIONS

International Search Report from corresponding Int'l Application No. PCT/GB2009/000579 dated Jun. 19, 2009.

(Continued)

*Primary Examiner* — Patrick F Brinson
(74) *Attorney, Agent, or Firm* — Snell & Wilmer L.L.P.

(57) ABSTRACT

A pipe-clamping tool (100) comprises a tool body (102) and first and second tool jaws (104, 106). The tool further comprises a bar (110) in threaded engagement with a portion of the tool body. One end of the bar engages with a boss (108) on a side of the first tool jaw opposite the curved surface thereof. The tool jaws may be closed and opened by rotation of a handwheel (112). The first tool jaw has projections (111A, 111B) which engage respective grooves (101A, 101B) on opposite sides of the tool body; together with the bar and boss, these inhibit rotation of the first tool jaw with respect to the tool body. The pipe-clamping tool may be used to stop a leak in a pipe by applying a layer of deformable material around the pipe and clamping it in place using the tool. The tool enables a substantially complete (360°) azimuthal seal around a pipe with only a single operation on the tool (i.e. rotation of the handwheel to close the tool jaws). The tool jaws remain mutually aligned as they are opened and closed. The tool may be used on pipes having various external diameters.

35 Claims, 10 Drawing Sheets

U.S. PATENT DOCUMENTS

| | | | | |
|---|---|---|---|---|
| 2,236,913 A | * | 4/1941 | Merrill | 138/99 |
| 3,117,904 A | | 1/1964 | Black | 156/475 |
| 3,487,857 A | | 1/1970 | Lee | 138/99 |
| 3,502,112 A | * | 3/1970 | Hankila | 138/99 |
| 3,596,898 A | * | 8/1971 | Hilburn | 269/243 |
| 4,342,338 A | * | 8/1982 | Glennie | 138/99 |
| 5,312,097 A | * | 5/1994 | Womack | 269/139 |

FOREIGN PATENT DOCUMENTS

| | | |
|---|---|---|
| EP | 1278982 | 9/2004 |
| FR | 591349 | 7/1925 |
| GB | 210647 | 2/1924 |
| GB | 308941 | 4/1929 |
| GB | 767746 | 2/1957 |
| GB | 1030909 | 5/1966 |
| GB | 2355293 | 4/2001 |
| WO | WO 00/66924 | 11/2000 |

OTHER PUBLICATIONS

UK Search Report from corresponding UK Application No. GB0807736.4 dated May 24, 2008.

\* cited by examiner

PIPE-CLAMPING TOOL

CROSS-REFERENCE TO RELATED APPLICATIONS

This application is U.S. national phase filing under 35 U.S.C. §371 of PCT/GB2009/000579 filed Mar. 4, 2009 and claims priority from United Kingdom Application Nos. GB0804452.1 and GB0807736.4 which were filed on Mar. 11, 2008 and Apr. 29, 2008, respectively, all of which are incorporated herein by reference.

The invention relates to pipe-clamping tools suitable for use in operations such as effecting a temporary repair in a leaking pipe or providing a leak-proof connection between two pipes, for example. In this specification, a pipe means a hollow, generally cylindrical conduit, tube, main, or channel etc for carrying a fluid such as water, oil, air, gas or hydraulic fluid, which may be made of any one of a variety of materials such as metal (e.g. copper) or plastic and which provides at least some mechanical resistance when subject to a compressive force applied transverse to the longitudinal axis of the pipe.

The need to stop leakage of fluid from a pipe arises in various systems. For example, in a plumbing system comprising a network of copper pipes a leak may arise when water in a pipe expands on freezing to cause a rupture of the pipe. When the water returns to a liquid state following a temperature rise, water escapes through the rupture thus giving rise to a water leak. A leak can also arise where two pipes of different diameter are joined. When a leak occurs in pipework, it is usually imperative to stop leakage as quickly as possible. Water leaks can cause damage to buildings and their contents, and gas leaks can result in explosions.

Known pipe-clamping tools comprise two basic elements, namely a piece of deformable material, such as rubber, and some mechanical means to clamp the piece of deformable material onto a pipe so as to cover a rupture and prevent egress of fluid from the rupture.

A pipe-clamping tool of one known type (see for example U.S. Pat. No. 1,601,264 and UK patent 767 746) comprises a support element having at a first end a first concave surface in the form of a partial cylinder. The first concave surface is provided at least in part with a piece of deformable material (e.g. rubber). The support element extends around the longitudinal axis of the cylinder of which the concave surface forms part (which axis coincides with the longitudinal axis of a pipe to be clamped when the clamp is used) and is provided at a second end with a threaded bore in which is engaged a threaded bar or bolt which carries another element having a second concave surface in the form of a partial cylinder, such that the two concave surfaces oppose each other. In use of the pipe-clamping tool, the piece of deformable material is placed over a leaking rupture point on a pipe and the threaded bar or bolt is turned manually so that the two concave surfaces clamp the pipe on opposite sides thereof with a force sufficient to cause the deformable material to prevent further egress of fluid from the rupture point.

Another known pipe-clamping tool (see French patent 591 349) comprises two support members each carrying a respective clamping part having a concave surface provided with deformable material. One clamping part is carried on a threaded bar which is in threaded engagement with one support member, the other clamping part being fixed to the other support member. The two support members are hinged together. In use, the pipe-clamping tool is placed around a leaking pipe with the two support members apart. The two support members are then closed together around the pipe and the threaded bar is rotated so that the pipe is clamped by the deformable material on the concave surfaces of the clamping parts.

A first aspect of the present invention provides a pipe-clamping tool comprising first and second tool jaws each having a concave substantially semi-cylindrical surface, the first tool jaw being displaceable with respect to the second tool jaw such that the tool jaws may be brought together around a pipe with the concave surfaces forming respective portions of a hollow cylinder, the pipe-clamping tool further comprising biasing means for biasing the tool jaws together and means arranged to inhibit rotation of the first tool jaw with respect to the second tool jaw.

Once a layer of deformable material (e.g. rubber) has been wrapped around a length of pipe, a pipe-clamping tool of the invention allows a substantially complete (i.e. approximately 360°) azimuthal seal around the pipe with only a single operation on the tool, namely application of the biasing means to bias the tool jaws together so as to clamp the layer of deformable material around the pipe. Furthermore, because a substantially complete azimuthal seal can be effected, the tool can be applied at any azimuthal orientation with respect to the pipe, which may be advantageous where the pipe is in close proximity to a wall, floor, ceiling or another pipe. Additionally, by making a suitable choice for the diameter of the concave, semi-cylindrical surfaces, the tool may be applied to pipes of various diameters. For example this diameter may be chosen so that the tool may be applied to pipes of various diameters found in domestic and/or commercial premises.

Pipe-clamping tools such as those disclosed in U.S. Pat. No. 1,601,264 and UK 767 746 provide only a partial azimuthal seal around a pipe. A user of such a tool must therefore make at least some estimate of the azimuthal position of a leak, in addition to its longitudinal position, and apply the tool at an appropriate azimuthal orientation. This can cause a delay in stopping a leak. Furthermore, it may not be possible to apply such a clamp at a required azimuthal orientation due to blocking by a wall, floor, ceiling or another pipe. These problems are mitigated in the case of a pipe-clamping tool of the present invention.

The pipe-clamping tool disclosed in French patent 591 349 provides a substantially complete azimuthal seal around a pipe but cannot be applied to pipes of different external diameter, in other words such a pipe-clamping tool can only be reliably applied to a pipe having a particular external diameter for which the tool is designed. In contrast, a pipe-clamping tool of the invention may be applied to pipes of various external diameter.

The pipe-clamping tools disclosed in the prior art mentioned above also have the disadvantage that when the threaded bar carrying one of the clamping parts is rotated, the carried clamping part also tends to rotate. This means that a user has to intervene to manually maintain the alignment of that clamping part so that it will conform to the pipe to be clamped as the threaded bar is rotated. This disadvantage can mean that a user comes into physical contact with a pipe to be clamped, which can result in harm to the user if the pipe is hot or if fluid leaking from the pipe is corrosive, poisonous etc. Such intervention is not required in use of a pipe-clamping tool of the invention as such a tool comprises means to inhibit rotation of the first tool jaw with respect to the second tool jaw. Once the second tool jaw is aligned to a pipe, the first tool is also aligned, and remains aligned as the tool jaws are brought together.

Conveniently the pipe-clamping tool comprises a tool body, the second tool jaw being fixed on or formed integrally with the tool body.

The biasing means may comprise a bar in threaded engagement with a portion of the tool body such that rotation of the bar with respect to the tool body advances the bar to bias the first tool jaw towards the second tool jaw. This provides an effective mechanical means for closing the tool jaws around a pipe after a layer of deformable material has been applied to the pipe.

Preferably the first tool jaw comprises a boss on a side of the first tool jaw opposite the concave, semi-cylindrical surface thereof, the boss engaging an end of the bar to allow free rotation of the bar within the boss about the longitudinal axis of the bar. This allows controlled closing and opening of the tool jaws irrespective of the orientation of the tool.

If the first tool jaw is displaceable with respect to the second tool jaw along a displacement axis substantially orthogonal to a plane containing the straight edges and longitudinal axis of the concave surface of the second tool jaw and the bar is substantially parallel to the displacement axis, then the number of turns of the bar needed to close the tool jaws (or to separate them to a given separation when removing the tool from a pipe) is minimised for a given thread pitch, reducing the time needed to apply or remove the tool.

Preferably the boss engages said end of the bar so as to inhibit rotation of the first tool jaw with respect to the tool body other than about the longitudinal axis of the bar. This is a convenient arrangement to assist in maintaining alignment of the tool jaws. More preferably, in addition the first tool jaw comprises engaging means engaging with the tool body to inhibit rotation of the first tool jaw with respect to the tool body about the longitudinal axis of the bar. Conveniently the engaging means comprises first and second projections mutually displaced along the length of the first tool jaw, each projection including a lug engaging a groove in the tool body, or alternatively the first tool jaw may have shoulder portions which flank sides of the tool body.

For ease of manufacture, and to produce a lightweight pipe-clamping tool, preferably the tool body and the first and second tool jaws are made of plastic. The bar may be a metal bar, and, if necessary, the portion of the tool bar that is in threaded engagement with the bar may comprise a threaded metal insert so that the tool body is provided with resilient metal threads.

Preferably the bar is provided with means for increasing the torque that may be applied by hand to the bar, for example a handwheel. This allows the tool to be used without the need for any other tools such as spanners, screwdrivers etc and thus allows a leak to be repaired quickly without the need to search for, collect and use additional tools. A handwheel is most conveniently located at an end of the bar remote from the first tool jaw.

The biasing means may comprise at least one additional bar in threaded engagement with a portion of the tool body such that rotation of the at least one additional bar with respect to the tool body allows an additional biasing force, or as the case may be, additional biasing forces, to be applied to a corresponding position or positions along the length of the first tool jaw. This provides for secure clamping and leak prevention over a greater length of pipe; for example a single elongate device may be used to stop several leaks along a particular length of pipe.

Although a pipe-clamping tool of the invention may be used with a piece of deformable material wrapped around a pipe, more preferably the tool further comprises a deformable element comprising a hollow cylinder of deformable material having a slit along its length, the internal and external diameters of the deformable element being such that the deformable element may be placed around a pipe and held under compression between the concave, semi-cylindrical surfaces of the tool jaws when the tool jaws are biased together. This allows deformable material to be quickly and easily placed completely azimuthally around the pipe prior to application of the tool jaws to the deformable element. For ease of manufacture, preferably the slit is substantially straight and runs substantially parallel to the longitudinal axis of the deformable element.

Each tool jaw may have a lip extending radially outwards from each straight edge of its concave surface, the deformable element being provided with first and second diametrically opposed flanges extending radially outwards from the outer cylindrical surface thereof one of which flanges coincides with said split and is divided into two sub-portions, the radial extent of each lip of the tool jaws being substantially the same as that of the flanges of the deformable element. This allows the tool jaws to be easily located on the deformable element when the latter is in position around a pipe. Furthermore, the two sub-portions of the flange which coincides with the slit allow the slit to be very reliably sealed when clamped by the tool jaws.

The deformable element may have an internal diameter substantially equal to the external diameter of any one of a variety of common pipes, for example 10 mm, 15 mm, 22 mm, 28 mm, 35 mm or 42 mm.

The deformable element may have two length portions having different internal diameters so that the tool may be effectively applied to a leak at or close to a join between two pipes of different external diameter. This concept may be extended so that the deformable element has three or more length portions each having a different internal diameter.

As an alternative to use of a separate piece of deformable material, or the deformable element, the curved surfaces of the tool jaws may each be provided with a layer of deformable material in the form of a hollow semi-cylinder such that when the tool jaws are biased together, the layers of deformable material form respective portions of a hollow cylinder. This allows the tool to be directly applied to a pipe to stop a leak. The internal diameter of the hollow cylinder so formed may be chosen to match a particular pipe diameter so that a tight seal is provided when the tool jaws are biased together. The hollow cylinder may have length portions of different internal diameter so that the tool may be applied to a length of pipework having pipes of different external diameter.

The external diameter of the deformable element may match the internal diameter of the semi-cylindrical surfaces of the jaws of the tool. The external diameter of the deformable element may be slightly bigger than the internal diameter of the semi-cylindrical surfaces of the jaws of the tool. If the external diameter of the deformable element is a little bigger than the internal diameter of the semi-cylindrical surfaces of the jaws, this may assist in providing compressive force on the pipe, assisting in sealing due to compression of the deformable element. "Slightly bigger" may mean 1% larger in diameter, or 2% larger, or 3%, or 4%, or 5% or 10% larger, or larger by 15% or more, or larger by an amount at or about, or in a range between, these amounts.

A second aspect of the invention provides a kit for sealing a leak in a pipe, the kit comprising a pipe-clamping tool according to the first aspect of the invention and deformable material. Preferably the deformable material comprises at least one deformable element each comprising a hollow cylinder of deformable material having a slit along its length, the internal and external diameters of any deformable element being such that the deformable element may be placed around a pipe and held under compression between said concave surfaces of the tool jaws when the tool jaws are biased together. The kit may comprises two or more such deformable elements having different internal diameters so that the kit may be applied to pipes of various external diameter.

The external diameters of the deformable elements of different internal diameter are preferably about the same (but may differ).

A third aspect of the invention provides a method of sealing a leak in a pipe, the method comprising the steps of:
(i) applying deformable material around the pipe to cover the leak;
(ii) positioning the tool jaws of a pipe-clamping tool according to the first aspect of the invention around the deformable material; and
(iii) biasing the tool jaws together to compress the deformable material around the pipe.

Embodiments of the invention are described below by way of example only with reference to the accompanying drawings in which.

Figure 1:
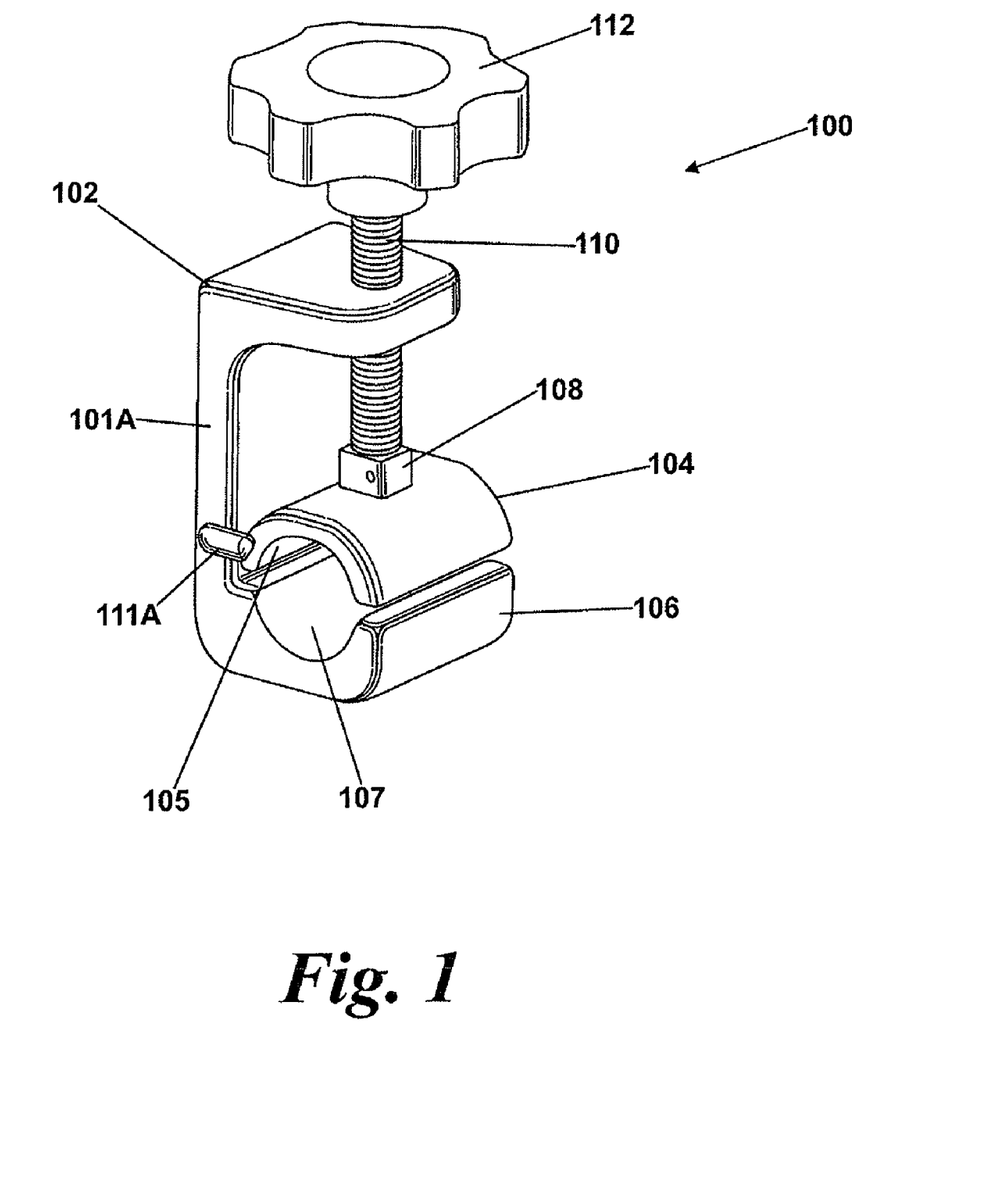
FIG. 1 shows a perspective view of a pipe-clamping tool of the invention.
Figure 2:
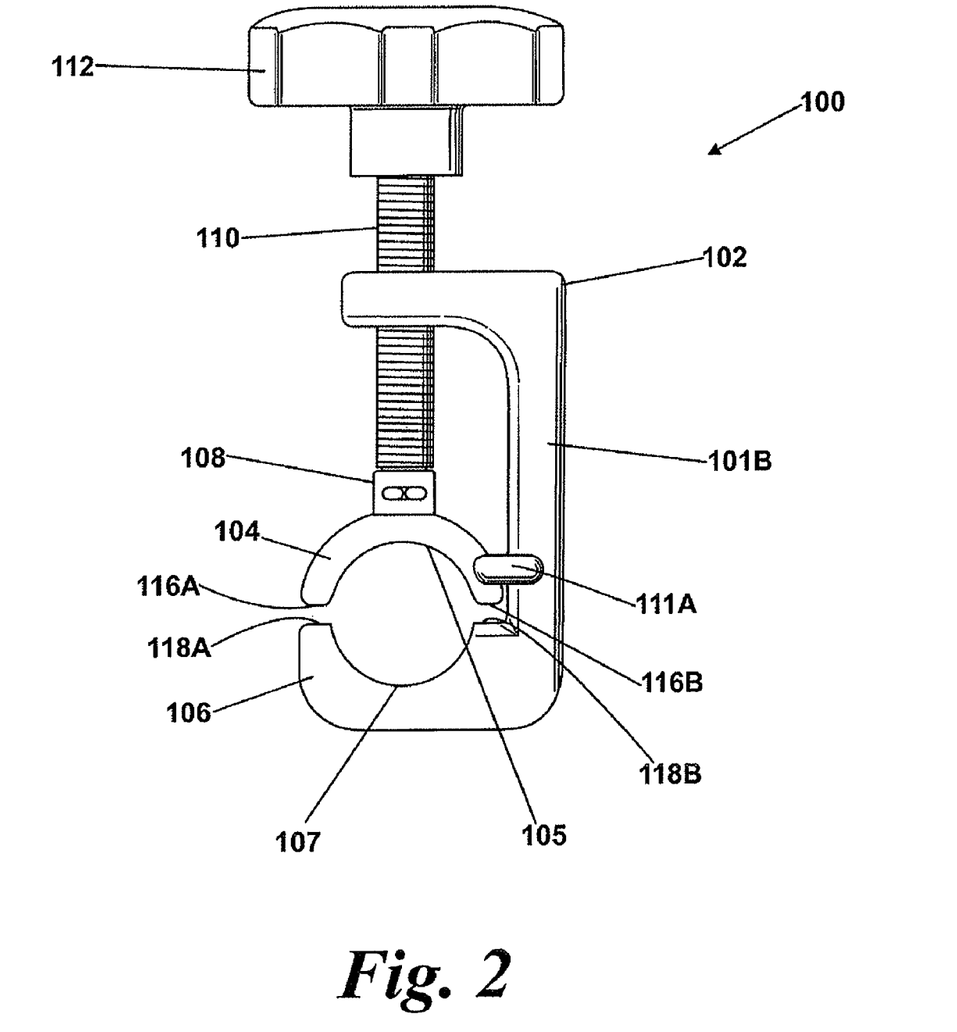
FIG. 2 shows a side view of the FIG. 1 tool.
Figure 3:
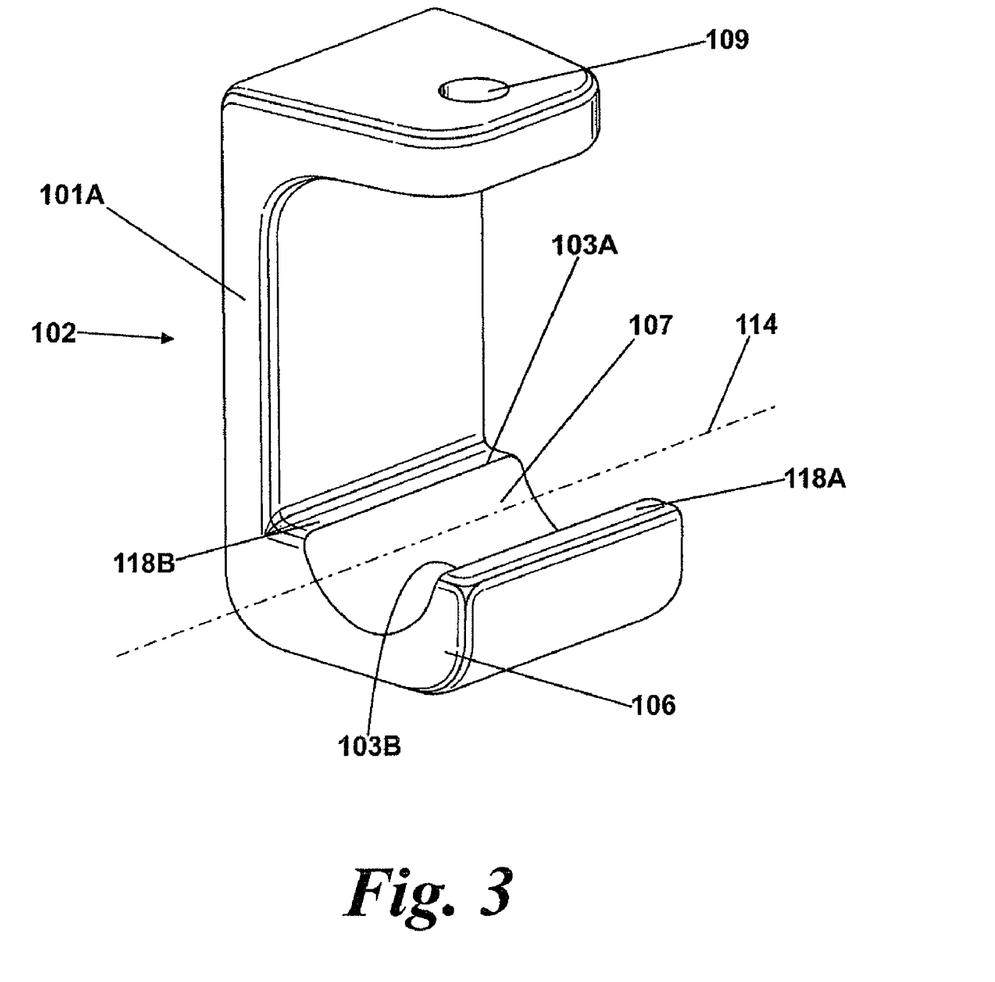
FIG. 3 shows a perspective view of a tool body comprised in the FIG. 1 tool.
Figure 4:
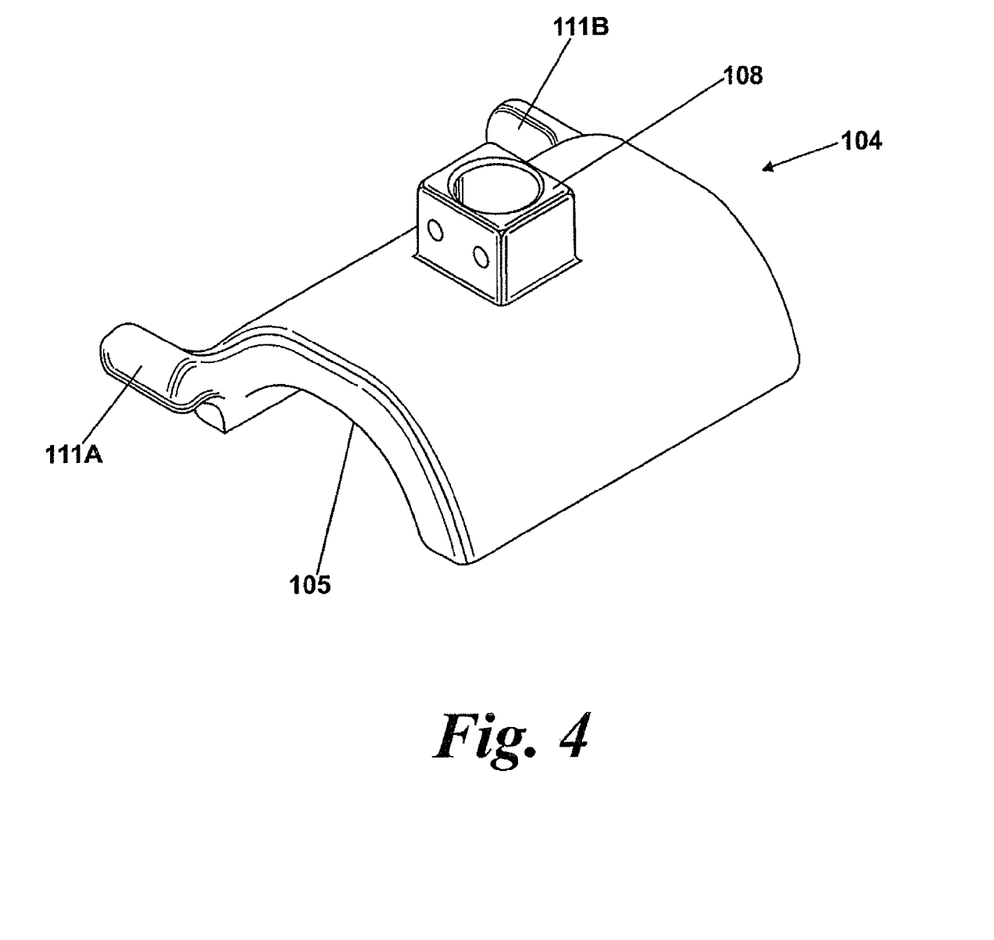
FIG. 4 shows a perspective view of a tool jaw comprised in the FIG. 1 tool.
Figure 5:
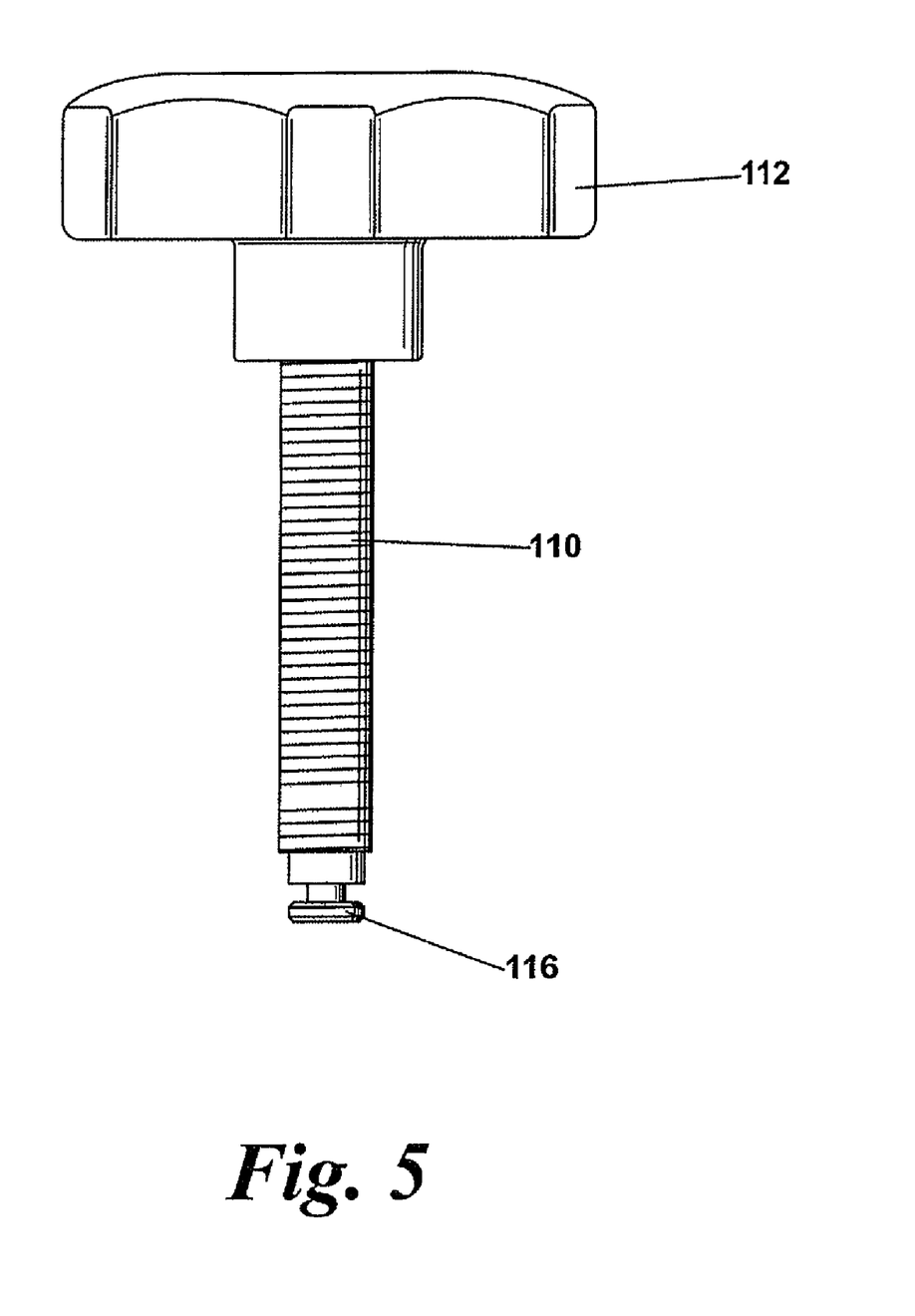
FIG. 5 shows a side view of a threaded bar comprised in the FIG. 1 tool.

Referring to FIGS. 1 to 5, a pipe-clamping tool 100 of the invention comprises a plastic tool body 102 having first 104 and second 106 plastic tool jaws. The second tool jaw 106 is formed integrally with the tool body 102. The first 104 and second 106 tool jaws each have a concave, substantially semi-cylindrical concave surface 105, 107, the tool jaws 104, 106 being arranged such that their respective concave surfaces 105, 107 oppose each other. A metal bar 110 passes through, and is in threaded engagement with, a portion of the tool body 102 remote from the second tool jaw 106. The hole 109 in the tool body 102 through which the bar 100 passes is provided with a threaded metal insert (not shown) to ensure that the threads on the bar 110 are resiliently engaged with threads of the tool body 102. One end of the metal bar 110 is provided with a handwheel 112 which allows the pipe-clamping tool 100 to be applied firmly to a pipe without the need for additional tools such as spanners, screwdrivers etc. The end of the metal bar 110 remote from the handwheel 112 is provided with a lug 116 which engages a boss 108 on the first tool jaw 104, the boss 108 being located on a side of the first tool jaw 104 remote from the concave, semi-cylindrical surface 105 thereof. The lug 116 allows the bar 110 to rotate freely within the boss 108. Rotation of the metal bar 110 in a first direction biases the first tool jaw 104 towards the second tool jaw 106, whilst rotation in the opposite sense separates the tool jaws 104, 106. Specifically, by rotation of the handwheel 112, the first tool jaw 104 may be displaced along a displacement axis which is substantially normal to a plane containing the straight edges 103A, 103B and longitudinal axis 114 of the concave surface 107 of the second tool jaw 106. The bar 110 is substantially parallel to the displacement axis. When the tool jaws 104, 106 are brought together, as is shown in FIGS. 1 and 2, the concave, semi-cylindrical surfaces 105, 107 form portions of a hollow cylinder. The boss 108 engages the lug 116 so as to inhibit rotation of the first tool jaw 104 with respect to the tool body 102, except for rotation about the longitudinal axis of the bar 110.

The second tool jaw 106 has lips 118A, 118B extending radially outwards from the straight edges 103A, 103B of the concave semi-cylindrical surface 107. The first tool jaw 104 has similar lips 116A, 116B.

The first tool jaw 104 has projections 111A, 111B at opposites end thereof. Each projection 111A, 111B engages with a corresponding groove 101A, 101B in the tool body 102. The grooves 101A, 101B are located on opposite sides of the tool body 102. The grooves 101A, 101B and projections 111A, 111B serve to inhibit rotation of the first tool jaw 104 about the longitudinal axis of the bar 110. The grooves 101A, 101B, projections 111A, 111B, boss 108 and bar 110 thus serve to inhibit any rotation of the first tool jaw 104 with respect to the tool body 102 and the second tool jaw 106. This means that the tool jaws 104, 106 remain mutually aligned as they are opened and closed using the handwheel.

In use of the pipe-clamping tool 100, a piece of deformable material, for example rubber, is placed around a pipe to cover a leak. With the tool jaws 104, 106 separated the tool jaws 104, 106 are placed around the deformable material and the first tool jaw 104 is biased towards the second tool jaw 106 by appropriate rotation of the handwheel 112 so that the piece of deformable material is clamped in place under compression to stop further leakage. When the tool jaws 104, 106 are closed, the surfaces 105, 107 form portions of a hollow cylinder. As the tool jaws 104, 106 are closed together or separated, the longitudinal axes of the semi-cylindrical surfaces 105, 107 remain substantially parallel, so that no manual intervention by a user of the tool 100 is required to align the first tool jaw 104 to a pipe, once the second tool jaw 106 is aligned to the pipe. The first tool jaw 104 moves in a straight line with respect to the second tool jaw 106 as the tool jaws 104, 106 are opened and closed.

Figure 6:
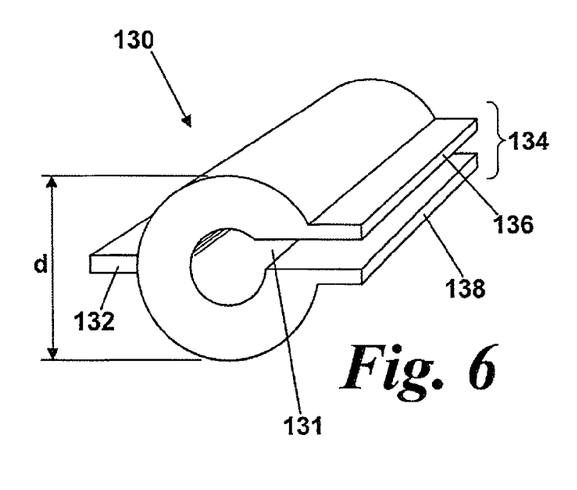
FIGS. 6 to 9 show perspective views of deformable elements for use with the FIG. 1 tool.

FIG. 6 shows a perspective view of a rubber deformable element 130 which may be used with the pipe-clamping tool 100. The element 130 is generally in the form of a hollow cylinder having an external diameter d slightly larger than the internal diameter of the hollow cylinder formed by the concave surfaces 105, 107 of the tool jaws 104, 106 when biased together. The internal diameter of the element 130 is substantially the same as the outer diameter of a typical pipe found in domestic or commercial premises. The deformable element 130 has a straight slit 131 extending along its length generally parallel to the longitudinal axis of the element 130. The element 130 has diametrically opposed flanges 132, 134 extending radially outward. The flange 134 coincides with the split 134 such that the flange 134 is divided into two sub-portions 136, 138.

The deformable element 130 may be used with the tool 100 to stop a leak in a pipe by initially placing the deformable element 130 around a pipe so as to cover the leak. With the tool jaws 104, 106 of the tool 100 open, the tool jaws 104, 106 are placed around the deformable element 130 parallel to the pipe and the bar 110 rotated by use of the handwheel 112 so as to bias the tool jaws 104, 106 together such that the deformable element 130 is compressed against the pipe to stop the leak.

Figure 7:
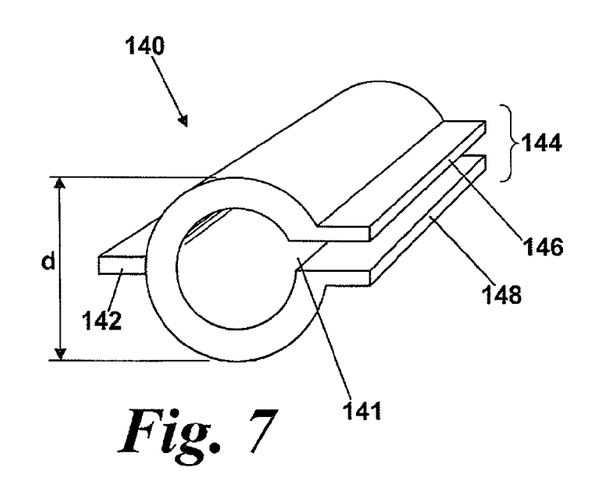

FIG. 7 shows an alternative deformable element 140 having the same external diameter d as that of the deformable element 130 of FIG. 6. The deformable element 140 has flanges 142, 144 and a slit 141 along its length as per the element 130. Flange 144 coincides with slit 141 and has two sub-portions 146, 148. However the internal diameter of the element 140 is greater than that of the element 130, so that it may be applied to a pipe of larger diameter.

Figure 8:
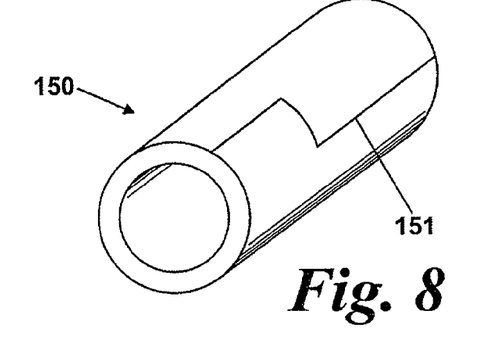
Figure 9:
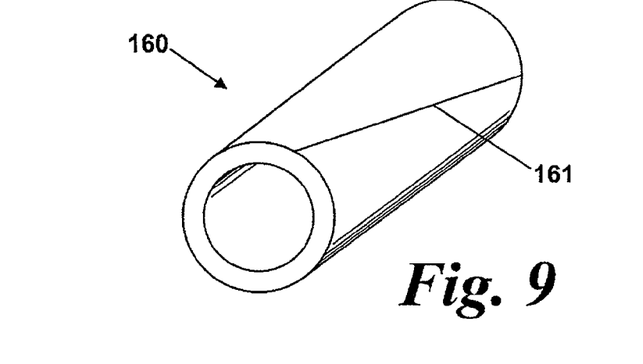

FIGS. 8 and 9 show further alternative rubber deformable elements 150, 160 which are each in the form of a hollow cylinder. The elements 150, 160 have respective slits 151, 152 running along their lengths. The slit 151 has first and second portions which are both parallel to the longitudinal axis of the element 150, but which are at different azimuth positions, and a third portion at a single longitudinal position extending azithmuthally around the surface of the element 150 so as to connect the other two portions. The slit 161 extends along the length of the element 160 but is not parallel to the longitudinal axis of the element 160.

Figure 10:
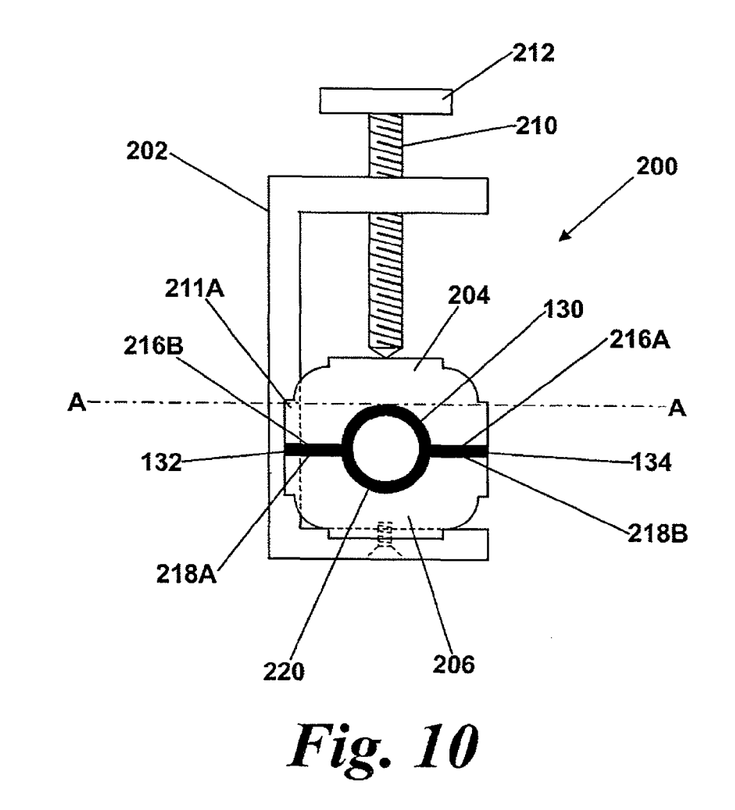
FIG. 10 shows a side-view of another pipe-clamping tool of the invention and a deformable element clamped around a pipe.

FIG. 10 shows a side view of another tool 200 of the invention, parts of the tool 200 corresponding to those of the FIG. 1 tool being given corresponding reference signs. Tool jaws 204, 206 are shown in a closed position with the deformable element 130 clamped by the tool jaws 204, 206 around a pipe 220. The flanges 132, 134 of the deformable elements 130 are clamped between lips 216A, 218A and 216B, 218B of the tools jaws 204, 206 to ensure a reliable, substantially complete (360°) seal around the pipe.

Figure 11:
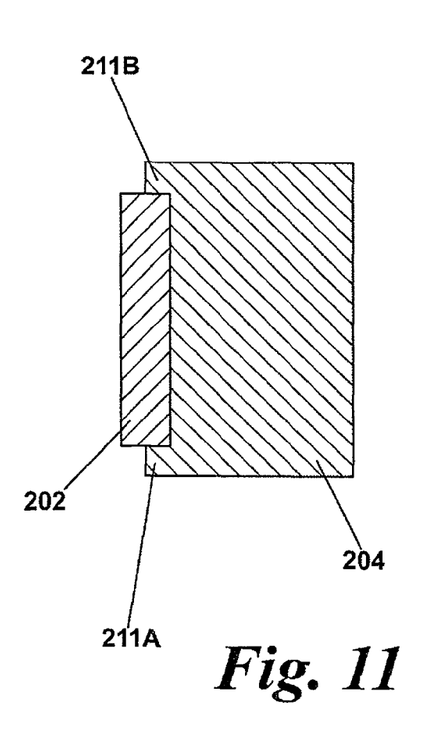
FIG. 11 shows a section through the tool of FIG. 10 on a plane orthogonal to the plane of FIG. 10 and passing through a line A-A in FIG. 10.

FIG. 11 shows a section through the tool 200 of FIG. 10 along a plane which is perpendicular to the plane of FIG. 10 and which passes through the line A-A in FIG. 10. The tool jaw 204 has shoulder portions 211A, 211B which flank the tool body 202 and which guide the tool jaw 204 along the tool body 202. The shoulder portions 211A, 211B of the tool jaw 204 also serve to inhibit rotation of the tool jaw 204 with respect to the tool jaw 206 (and tool body 202) thus assisting in maintaining mutual alignment of the tool jaws 204, 206.

Figures 12, 13:
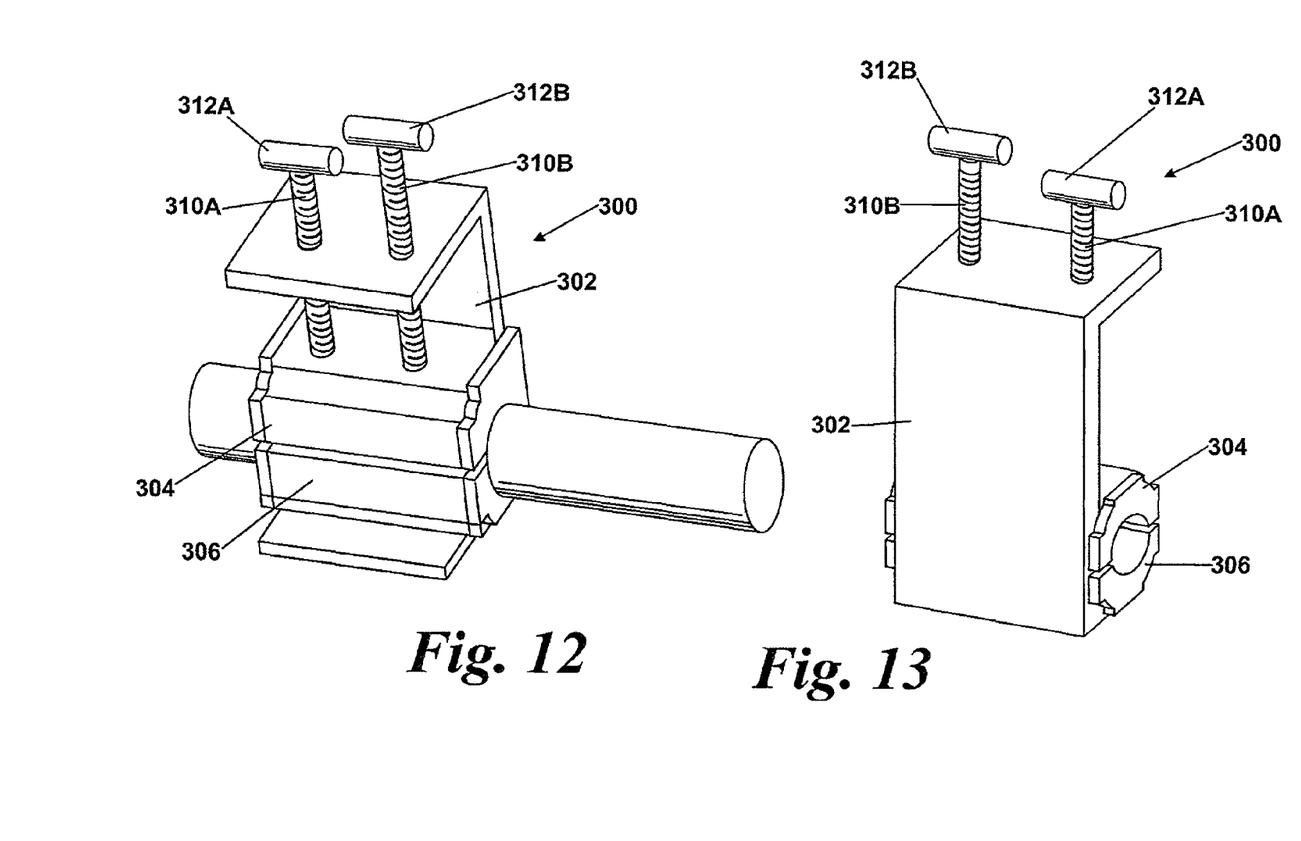
FIGS. 12 and 13 show front and rear views of a further tool of the invention.

FIGS. 12 and 13 show front and rear views respectively of a further pipe-clamping tool 300 of the invention. The tool 300 is of generally similar construction to the tool 100 of FIGS. 1 and 2, having a tool body 302 and first and second tool jaws 304, 306. The pipe-clamping tool 300 has two bars 310A, 310B in threaded engagement with a portion of the tool body 302 and arranged such that each may apply a biasing force to the first tool jaw 304 at a different longitudinal position along the first tool jaw 304. This allows secure clamping over a longer length of pipe, for example the pipe-clamping tool 300 (which is elongate along its cylindrical axis compared to the tool 100 of FIG. 1) may be used to stop several leaks in a longer length of pipe. Bars 310A, 310B have respective handles 312A, 312B to increase the torque that may be applied by hand to the bars 310A, 310B.

Figure 14:
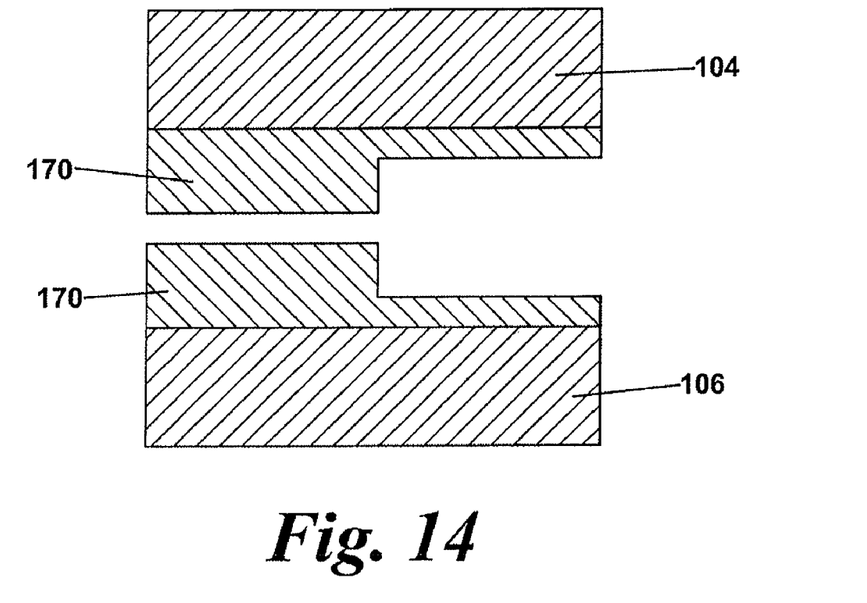
FIGS. 14 to 16 show vertical sections through tool jaws of the FIG. 1 tool when the tool jaws are closed around deformable elements each of which has length portions of different internal diameter.
Figure 15:
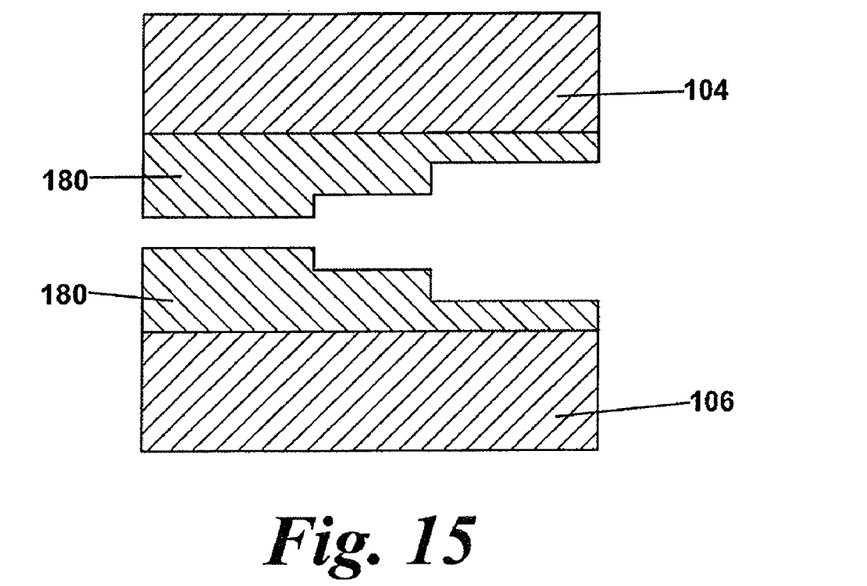
Figure 16:
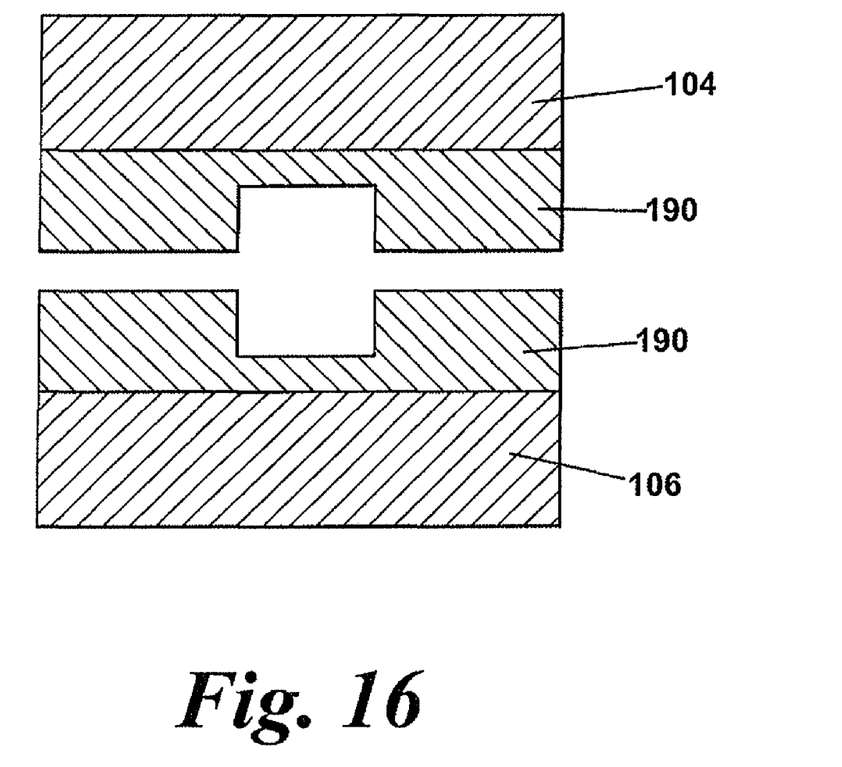

FIGS. 14, 15 and 16 show longitudinal sections through the first 104 and second 106 tool jaws of the pipe-clamping tool 100 when the tool jaws 104, 106 are closed around three different deformable elements 170, 180, 190 respectively. The deformable elements 170, 180, 190 each have the form of a hollow cylinder, the external diameter of which is slightly greater than the internal diameter formed by the surfaces 105, 107 of the tool jaws 104, 106 when in a closed position.

Referring to FIG. 14, the deformable element 170 has two length portions of different internal diameter so that the tool 100 may be applied to a length of pipework having two different external diameters, such as occurs where two pipes are joined.

Referring to FIG. 15, a deformable element 180 has three length portions having different internal diameters and thus may be used with the tool 100 to clamp a length of pipework having three lengths of pipe of different external diameter.

Referring to FIG. 16, a deformable element 190 has three length sections, two of which have the same internal diameter.

A kit may comprise a length of deformable element that is significantly longer than the length of the jaws of a tool of the invention (in the elongate direction of the jaws that are in use aligned with the axis of a pipe), and instructions to cut or break off a length of deformable element for use with the tool, possibly at the time of need.

The invention claimed is:

1. A pipe-clamping tool comprising:
   first and second tool jaws each having a concave substantially semi-cylindrical surface, the first tool jaw being displaceable with respect to the second tool jaw such that the tool jaws may be brought together around a pipe with the concave surfaces forming respective portions of a hollow cylinder, the pipe-clamping tool further comprising biasing means for biasing the tool jaws together and means arranged to inhibit rotation of the first tool jaw with respect to the second tool jaw; and
   a deformable element comprising a hollow cylinder of deformable material having a slit along its length, the internal and external diameters of the deformable element being such that the deformable element may be placed around a pipe and held under compression between said concave surfaces of the tool jaws when the tool jaws are biased together; wherein the deformable element has two length portions having different internal diameters.

2. A pipe-clamping tool according to claim 1 comprising a tool body and wherein the second tool jaw is fixed on or formed integrally with the tool body.

3. A pipe-clamping tool according to claim 2 wherein the biasing means comprises a bar in threaded engagement with a portion of the tool body such that rotation of the bar with respect to the tool body advances the bar to bias the first tool jaw towards the second tool jaw.

4. A pipe-clamping tool according to claim 3 wherein the first tool jaw comprises a boss on a side of the first tool jaw opposite the concave, semi-cylindrical surface thereof and wherein the boss engages an end of the bar to allow free rotation of the bar within the boss about the longitudinal axis of the bar.

5. A pipe-clamping tool according to claim 4 wherein the first tool jaw is displaceable with respect to the second tool jaw along a displacement axis substantially orthogonal to a plane containing the straight edges and longitudinal axis of the concave surface of the second tool jaw and wherein the bar is substantially parallel to the displacement axis.

6. A pipe-clamping tool according to claim 5 wherein the boss engages said end of the bar so as to inhibit rotation of the first tool jaw with respect to the tool body other than about the longitudinal axis of the bar.

7. A pipe-clamping tool according to claim 6 wherein the first tool jaw comprises engaging means engaging with the tool body to inhibit rotation of the first tool jaw with respect to the tool body about the longitudinal axis of the bar.

8. A pipe-clamping tool according to claim 7 wherein the engaging means comprises first and second projections mutually displaced along the length of the first tool jaw, each projection including a lug engaging a groove in the tool body.

9. A pipe-clamping tool according to claim 7 wherein the engaging means comprises shoulder portions of the first tool jaw which flank the tool body.

10. A pipe-clamping tool according to claim 3 wherein the tool body and first and second tool jaws are made of plastic, the bar is a metal bar and the portion of the tool body in threaded engagement with the bar comprises a threaded metal insert.

11. A pipe-clamping tool according to claim 3 wherein the bar is provided with means for increasing the torque that may be applied by hand to the bar.

12. A pipe-clamping tool according to claim 11 wherein said means is a handwheel, the handwheel being preferably located at an end of the bar remote from the first tool jaw.

13. A pipe-clamping tool according to claim 3 and further comprising at least one additional bar in threaded engagement with a portion of the tool body such that rotation of the at least one additional bar with respect to the tool body allows an additional biasing force, or as the case may be, additional biasing forces, to be applied to the first tool jaw at a corresponding position, or as the case may be corresponding positions, along the length of the first tool jaw.

14. A pipe-clamping tool according to claim 1 wherein the slit is substantially straight and runs substantially parallel to the longitudinal axis of the deformable element.

15. A pipe-clamping tool according to claim 14 wherein each tool jaw has a lip extending radially outwards from each straight edge of its concave surface and wherein the deformable element is provided with first and second diametrically opposed flanges extending radially outwards from the outer cylindrical surface thereof one of which flanges coincides with said split so as to be divided into two sub-portions, the radial extent of each lip of the tool jaws being substantially the same as that of the flanges of the deformable element.

16. A pipe-clamping tool according to claim 1 wherein the deformable element has an internal diameter of substantially 10 mm, 15 mm, 22 mm, 28 mm, 35 mm or 42 mm.

17. A pipe-clamping tool according to claim 1 wherein the concave, semi-cylindrical surface of each tool jaw is provided with a layer of deformable material in the form of a hollow semi-cylinder such that when the tool jaws are biased together, the layers of deformable material form respective portions of a hollow cylinder.

18. A pipe-clamping tool comprising:
first and second tool jaws each having a concave substantially semi-cylindrical surface, the first tool jaw being displaceable with respect to the second tool jaw such that the tool jaws may be brought together around a pipe with the concave surfaces forming respective portions of a hollow cylinder, the pipe-clamping tool further comprising biasing means for biasing the tool jaws together and means arranged to inhibit rotation of the first tool jaw with respect to the second tool jaw; and
a deformable element comprising a hollow cylinder of deformable material having a slit along its length, the internal and external diameters of the deformable element being such that the deformable element may be placed around a pipe and held under compression between said concave surfaces of the tool jaws when the tool jaws are biased together; wherein the deformable element has three length portions each having a different internal diameter.

19. A pipe-clamping tool according to claim 18 comprising a tool body and wherein the second tool jaw is fixed on or formed integrally with the tool body.

20. A pipe-clamping tool according to claim 19 wherein the biasing means comprises a bar in threaded engagement with a portion of the tool body such that rotation of the bar with respect to the tool body advances the bar to bias the first tool jaw towards the second tool jaw.

21. A pipe-clamping tool according to claim 20 wherein the first tool jaw comprises a boss on a side of the first tool jaw opposite the concave, semi-cylindrical surface thereof and wherein the boss engages an end of the bar to allow free rotation of the bar within the boss about the longitudinal axis of the bar.

22. A pipe-clamping tool according to claim 21 wherein the first tool jaw is displaceable with respect to the second tool jaw along a displacement axis substantially orthogonal to a plane containing the straight edges and longitudinal axis of the concave surface of the second tool jaw and wherein the bar is substantially parallel to the displacement axis.

23. A pipe-clamping tool according to claim 22 wherein the boss engages said end of the bar so as to inhibit rotation of the first tool jaw with respect to the tool body other than about the longitudinal axis of the bar.

24. A pipe-clamping tool according to claim 23 wherein the first tool jaw comprises engaging means engaging with the tool body to inhibit rotation of the first tool jaw with respect to the tool body about the longitudinal axis of the bar.

25. A pipe-clamping tool according to claim 24 wherein the engaging means comprises first and second projections mutually displaced along the length of the first tool jaw, each projection including a lug engaging a groove in the tool body.

26. A pipe-clamping tool according to claim 24 wherein the engaging means comprises shoulder portions of the first tool jaw which flank the tool body.

27. A pipe-clamping tool according to claim 20 wherein the tool body and first and second tool jaws are made of plastic, the bar is a metal bar and the portion of the tool body in threaded engagement with the bar comprises a threaded metal insert.

28. A pipe-clamping tool according to claim 20 wherein the bar is provided with means for increasing the torque that may be applied by hand to the bar.

29. A pipe-clamping tool according to claim 28 wherein said means is a handwheel, the handwheel being preferably located at an end of the bar remote from the first tool jaw.

30. A pipe-clamping tool according to claim 20 and further comprising at least one additional bar in threaded engagement with a portion of the tool body such that rotation of the at least one additional bar with respect to the tool body allows an additional biasing force, or as the case may be, additional biasing forces, to be applied to the first tool jaw at a corresponding position, or as the case may be corresponding positions, along the length of the first tool jaw.

31. A pipe-clamping tool according to claim 18 wherein the slit is substantially straight and runs substantially parallel to the longitudinal axis of the deformable element.

32. A pipe-clamping tool according to claim 31 wherein each tool jaw has a lip extending radially outwards from each straight edge of its concave surface and wherein the deformable element is provided with first and second diametrically opposed flanges extending radially outwards from the outer cylindrical surface thereof one of which flanges coincides with said split so as to be divided into two sub-portions, the radial extent of each lip of the tool jaws being substantially the same as that of the flanges of the deformable element.

33. A pipe-clamping tool according to claim 18 wherein the deformable element has an internal diameter of substantially 10 mm, 15 mm, 22 mm, 28 mm, 35 mm or 42 mm.

34. A pipe-clamping tool according to claim 18 wherein the concave, semi-cylindrical surface of each tool jaw is provided with a layer of deformable material in the form of a hollow semi-cylinder such that when the tool jaws are biased together, the layers of deformable material form respective portions of a hollow cylinder.

35. A method of sealing a leak in a pipe, the method comprising the steps of:
  (i) applying deformable material around the pipe to cover the leak;
  (ii) positioning the tool jaws of a pipe-clamping tool according to at least one of claim 1 or claim 18 around the deformable material; and
  (iv) biasing the tool jaws together to compress the deformable material around the pipe.

* * * * *